Figure 1:
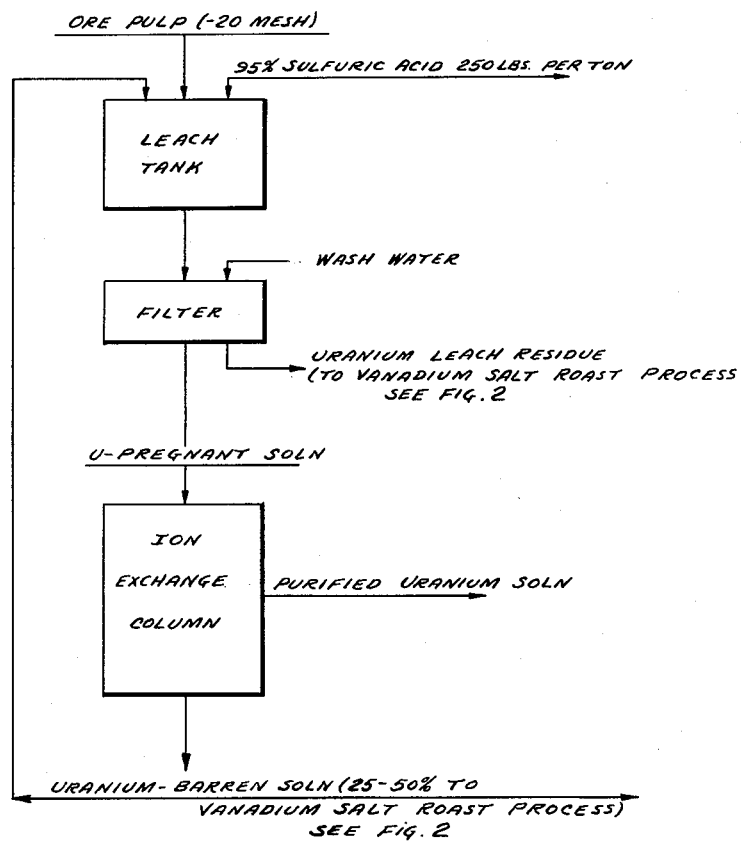

July 24, 1956     D. C. McLEAN     2,756,122
PROCESS FOR RECOVERING URANIUM AND VANADIUM FROM ORES
Filed Sept. 10, 1952     2 Sheets—Sheet 1

INVENTOR
DANIEL CHALMERS McLEAN
BY
ATTORNEY

INVENTOR
DANIEL CHALMERS McLEAN
BY Roland A. Anderson
ATTORNEY

# United States Patent Office 2,756,122
Patented July 24, 1956

2,756,122

PROCESS FOR RECOVERING URANIUM AND VANADIUM FROM ORES

Daniel Chalmers McLean, Watertown, Mass., assignor, by mesne assignments, to the United States of America as represented by the United States Atomic Energy Commission Application September 10, 1952, Serial No. 308,821

7 Claims. (Cl. 23—14.5)

This invention relates to an improved method of recovering uranium and vanadium from ores containing them. Specifically it relates to an improved method which is particularly applicable to carnotite ores which are high in lime.

It has been proposed in the past to recover uranium from ores containing both vanadium and uranium such as carnotite ores, by leaching with either acid or alkali and recovering the uranium from the leach liquors. The ore is usually salt roasted prior to leaching using the standard technique with rabbling. This procedure resulted in incomplete recovery of uranium, although giving a fair recovery of vanadium.

The present invention improves the efficiency of the recovery of vanadium and uranium from ores containing them and has the advantage that it gives excellent results with ores which are high in lime. These ores were not practically salt-roastable before, and therefore had not been considered suitable for economic exploitation. Even in the case of low lime ores the process of the present invention presents very marked economies and so the invention is not intended to be limited to the treatment of high lime vanadium and uranium ores, although it is in this field that its advantages are most marked over what was done in the past.

According to the present invention the ore is first leached with acid such as sulfuric in order to remove a maximum of the uranium content. The leaching technique is similar to that used in the past, but applied to the ore prior to salt roasting. Uranium is then recoved from the leach liquor by any suitable means which do not result in raising the pH of the mother liquor above 1.5. Typical examples of such suitable processes are those in which uranium complexes are formed on ion exchange resins. A barren uranium leach liquor results, which contains a considerable amount of vanadium, running from 10% to almost 15% of the vanadium content of the original ore. Only very small amounts of vanadium are lost in the best uranium recovery methods from the leach liquors.

The uranium leach residues are then salt roasted. This may be done by the standard method in which the residues after addition of a suitable amount of sodium chloride, are roasted in contact with the atmosphere with continuous or intermittent stirring by suitable rabbling means. While it is possible to use this type of salt roasting in the present process, it does not result in maximum vanadium recovery, and it is preferred to use a different type of salt roasting in which there is no stirring and the roasting takes place in a cake with a minimum exposure of surface to the atmosphere. It is also possible to add sufficient liquids to the residues to be roasted, so that they can be pelletized in the form of pellets having a relatively small surface area as compared to the ground ore. These pellets may then be roasted in any suitable furnace.

The salt-roasted residues from the uranium leach are then leached not with water or with a fresh acid or alkaline solution, but with a barren uranium leach liquor after removal of the uranium therefrom. The leaching however, is effected in a particular manner. Either the leach must be at a relatively low temperature below 40° C., instead of the high temperature (which is frequently used with salt roasts where the hot roasts is dropped into the leaching solution without material pre-cooling) or it is necessary to add additional acid to the leaching solution to maintain at all times during the leach a pH well below 2.0 and preferably between 1.0 and 1.5. If these precautions are taken a very high percentage of the vanadium in the leach residues is removed. If they are not followed, the vanadium recovery drops off very sharply. In every case the 10% or more of vanadium which is present in the barren uranium leach liquor is automatically added to the leach solution from the residues, and so is completely recovered without additional cost or without using a separate vanadium recovery step for the barren solution.

It is not desired to limit the invention to a theory of action, however, I believe that a factor in the peculiar leaching step may be local excessive neutralization of the leach liquor by the residues, which causes reprecipitation of dissolved vanadium. It is, however, possible that other factors may play a part. I do not know why the cool leaching should result in less neutralization of the acidity. This may be a factor of reactivity of the ore constituents, or it may be due to a different solubility of vanadium compounds at the critical pH around 2.0. In any event, either the relatively cool leaching or leaching with additional acid which keeps the pH low results in important savings because of the greatly increased recovery of vanadium.

All of the advantages brought out above are applicable both to ores which are high in lime and those which are low in lime. In addition the high lime ores are transformed by the acid uranium leach into ores in which the high calcium content is in a form that does not interfere with the salt roast and subsequent leaching.

It is a further advantage of the modification of the present invention in which the salt roasted residues are cooled down before leaching, that the physical characteristics of the residue particles are better than when very hot roast is suddenly chilled, as in a hot leach, where ore particles are mechanically broken down and produce a material that is less readily handled in leaching and filtration operations. The cold leach gives a product that is coarser and is more easily handled in leaching and filtration operations. This is an added practical operating advantage.

The roasting and cool leaching steps of the present invention permit a further practical operating saving for I have found that it is not necessary to grind the ore finely as is used in some salt roasting and leaching processes used in the past. Quite a coarse ore which may be as coarse as −10 mesh can be effectively processed by the present invention. This reduces grinding costs and the disadvantages which fine grinding with the production of slimes or difficulty filterable material carry with it. The possibility of using a much coarser ground ore is therefore an additional operating advantage of the present invention, though of course the invention is not limited thereto as the improved recovery of vanadium is also obtainable with more finely ground ore.

The use of the barren uranium leach liquor effects a further important economy. Of necessity this leach liquor is strongly acid and in practical operations will frequently have a pH of 1 or slightly lower. As a result in most leaching of the salt-roasted residues the barren solution contains sufficient acid for the purpose thus saving the cost of additional acid in this step even where the ore may be very high in acid consuming constituents and where possibly some additional acid would be needed. This additional acid is very slight compared to that which would be required if the barren solution were not used for leaching purposes. The continuous reuse of leaching solution, which is possible, in the present invention, is at first glance surprising, particularly with a high lime ore where there is a large consumption of sulfuric acid which reacts with calcium.

Figure 2:
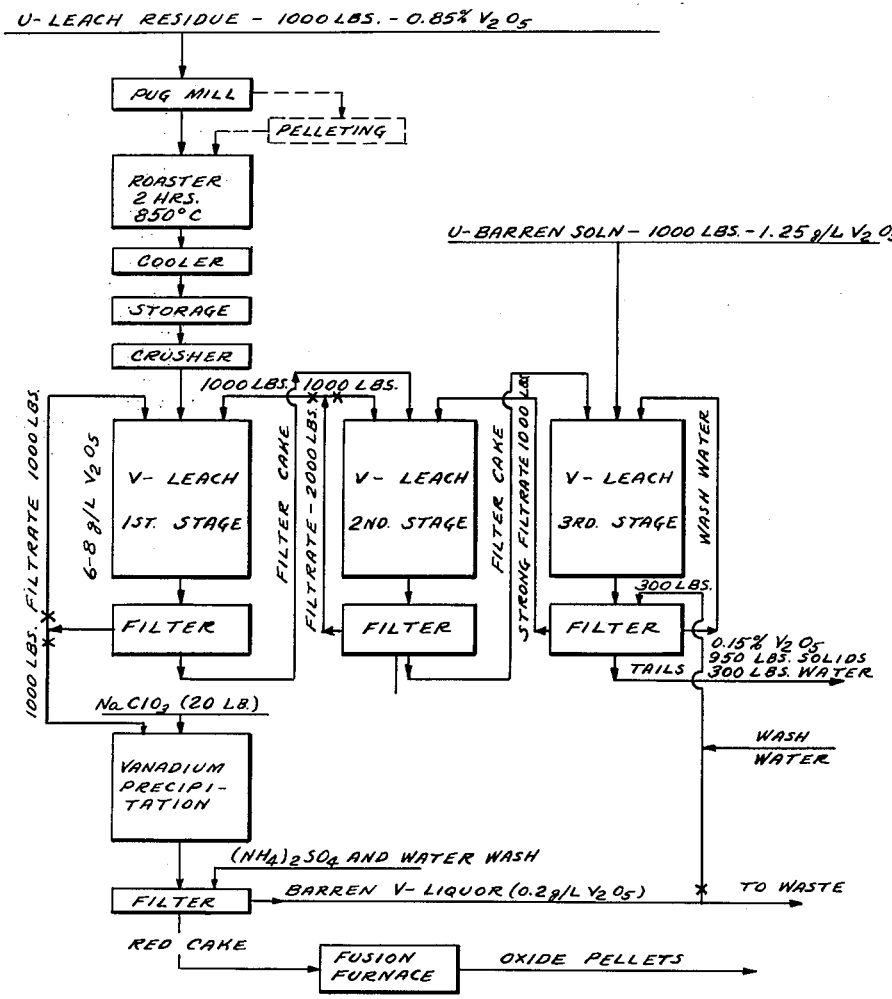

The invention will be described in greater detail in connection with the following specific example in which parts are by weight unless otherwise specified. The invention will also be described in conjunction with the drawings in which:

Fig. 1 is a diagrammatic flowsheet of the leaching process applied to a high lime vanadium uranium ore together with the uranium recovery and Fig. 2 is a diagrammatic flowsheet of the roasting and vanadium recovery from the residues of the leaching step of Fig. 1.

Fig. 1 shows the uranium leach of 1000 pounds of a high lime ore from the Lukachukai district containing 0.3% uranium, 1% $V_2O_5$ and 10% $CaCO_3$, which is wet ground to —20 mesh and introduced into a leaching vessel. Sulfuric acid, if desired with some of the uranium barren solution, is introduced until the amount of acid is 250 lbs. per ton of ore and the pH is about 1, the slurry being approximately 50% solids. After the leaching is complete the slurry is filtered and the residue washed. The filtrate and washings pass to an ion exchange resin column containing a standard anion exchange resin. The resin takes up the uranium sulfate complex ion, and the effluent which still contains the acid and about 1.25 gr./liter of $V_2O_5$ is designated on the drawings as "U-Barren." As stated above, part of this may be used in the uranium leaching step; the remainder being used in the vanadium leach step, which will be described below. A slight loss of vanadium occurs in the uranium recovery step as the ion exchange resin takes up a little vanadium of the order of a few per cent of the total vanadium content of the ore.

The wet residue from the filtration step described above, is introduced into a pug-mill with 80 lbs. of sodium chloride.

After thorough mixing in the pug-mill the wet residue is introduced into a roaster, which is designed to roast without rabbling. Alternatively, as shown in dotted lines on Figure 2, the wet pug-mill product may be pelletized and the pellets roasted in a suitable furnace such as a rotary kiln.

In any case the roasting is effected at about 850° C. for about 2 hours. After roasting is complete the roast is cooled, preferably to room temperature, and may be stored.

The cooled residue is crushed and introduced into the first leaching stage where it remains for one hour at 25° C. the slurry having a concentration of 33% solids. Leaching is effected by leach liquor from the next succeeding stage and a portion of the leach liquor obtained from the filtrate of the same stage.

The mixture is approximately 50%, about 2000 pounds in all. From the first leaching stage the solids are filtered, half of the filtrate being recycled, and the filter cake is introduced into the second leach stage where it is again leached for the same period of time with some of its own filtrate from the third leach stage. The second leach stage is followed by filtration, filter cake going to a third leach stage where it is leached with uranium barren solution. The residue from this stage is filtered, the filtrate as described above being used as leaching material for the second stage and the tails which contained approximately 950 pounds of solids to 300 pounds of water are discarded. In this last stage washing is employed in the filtration step. The washing may be with fresh water or with a small amount of barren vanadium liquor from the vanadium precipitation stage which will be described below. The washings may be used as part of the leach liquor for the third stage, in all about 300 pounds of washing solution are used.

A portion of the filtrate from the first leaching stage is introduced into a precipitating vessel where 2% sodium chlorate is added and sufficient sodium hydroxide to bring the pH to about 2.2. The temperature is raised to about 85° C. and precipitation of a batch of the size referred to above, takes about 4 to 6 hours. The oxidation potential resulting from the sodium chlorate addition is 780 millivolts as measured against the calomel-platinum electrode. After precipitation is complete the vanadium precipitate is filtered and the cake washed with water containing some ammonium sulfate. The cake is a finished vanadium product which can be recovered by any conventional means, such as for example by fusion to the oxide.

A barren liquor is produced from the precipitating step containing about 0.2 g./liter of $V_2O_5$. Part of this liquor is discarded and a portion may be used to wash the filter cake from the third stage of the leach. The amount of barren liquor which can be reused, depends on the buildup of other materials in the cycling liquors.

The filtration steps may be replaced by thickening in conventional thickeners.

Seven batches of ore were run through the process described above. The average assay of the residues leached for vanadium was 0.12% $V_2O_5$. The average recovery of the seven batches was as follows:

| | Per cent |
| --- | --- |
| Vanadium recovered in leach liquor | 85 |
| Vanadium loss in residue | 13.5 |
| Mechanical vanadium losses | 1.5 |

The efficiency of the precipitation step which does not differ from that used in the industry is in excess of 90%, so that the overall recovery of vanadium from the ore is approximately 80%.

The procedure of the above example was repeated, but instead of leaching cooled salt-roasted residue, the leaching was of the hot residue at an average temperature in the leach steps of 85 to 90° C. The pH rose to 1.9 and the vanadium recovery was actually less than the vanadium content of the uranium barren solution. It is thus apparent that as a pH of 1.9 to 2 is reached, the leaching step becomes practically useless.

I claim:

1. A process of recovering uranium and vanadium from ores containing them, which comprises sulfuric acid leaching the ground ore to dissolve substantially all of the uranium and a minor portion of the vanadium, removing uranium from the leach liquid at a pH below 1.5, subjecting the leached residues to salt roasting and leaching the roasted residues with a leach liquor containing the uranium barren leach liquid as a major constituent under leaching conditions maintaining a pH below 1.9, whereby a vanadium rich leach liquor is obtained and vanadium poor residue, separating the vanadium rich liquid and precipitating the vanadium therefrom.

2. A process according to claim 1, in which the salt roasted residues are cooled prior to leaching which is effected at a temperature below 40° C.

3. A process of recovering uranium and vanadium from ores containing them, which comprises sulfuric acid leaching the ground ore to dissolve substantially all of the uranium and minor portion of the vanadium, removing uranium from the leach liquor at a pH below 1.5, subjecting the leached residues to salt roasting and leaching the roasted residues with a leach liquor containing the uranium barren leach liquor as a major constituent under leaching conditions maintaining a pH between 1 and 1.5 whereby a vanadium rich leach liquor is obtained and a vanadium poor residue, separating the vanadium rich leach liquor and precipitating the vanadium therefrom.

4. A process according to claim 3, in which the salt roasted residues are cooled prior to leaching which is effected at a temperature below 40° C.

5. A process according to claim 1, in which the salt roast is effected under conditions so that the whole roast presents a small surface relative to its volume to the roasting atmosphere.

6. A process according to claim 5, in which the salt roasting is effected by forming the material to be roasted including both salt and residue into the form of a cake, the roasting operation being carried out without substantial agitation.

7. A process according to claim 1, in which the residues from the uranium extraction are mixed with salt and pelletized prior to roasting, whereby the roasting is effected with exposure of relatively small surface of the material to the roasting atmosphere.

No references cited.